United States Patent
Chu et al.

(10) Patent No.: US 8,451,683 B2
(45) Date of Patent: May 28, 2013

(54) METHOD FOR DETERMINING THE FLUID/PRESSURE DISTRIBUTION OF HYDROCARBON RESERVOIRS FROM 4D SEISMIC DATA

(75) Inventors: Dezhi Chu, Bellaire, TX (US); Ganglin Chen, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 751 days.

(21) Appl. No.: 12/719,566

(22) Filed: Mar. 8, 2010

(65) Prior Publication Data

US 2010/0254217 A1   Oct. 7, 2010

Related U.S. Application Data

(60) Provisional application No. 61/166,546, filed on Apr. 3, 2009.

(51) Int. Cl.
    *G01V 1/30* (2006.01)
(52) U.S. Cl.
    CPC ........ *G01V 1/308* (2013.01); *G01V 2210/6122* (2013.01); *G01V 2210/6248* (2013.01); *G01V 2210/6246* (2013.01)
    USPC .......................................................... 367/38
(58) Field of Classification Search
    CPC ............ G01V 1/308; G01V 2210/6122; G01V 2210/6246; G01V 2210/6248
    USPC ................................ 367/38; 702/13; 703/10
    See application file for complete search history.

(56) References Cited

U.S. PATENT DOCUMENTS

| | | | |
|---|---|---|---|
| 4,969,130 | A | 11/1990 | Wason et al. |
| 5,586,082 | A | 12/1996 | Anderson et al. |
| 5,798,982 | A | 8/1998 | He et al. .................. 367/73 |
| 5,873,051 | A | 2/1999 | Van Bemmel et al. |
| 5,905,657 | A | 5/1999 | Celniker |
| 6,041,018 | A | 3/2000 | Roche |
| 6,374,201 | B1 | 4/2002 | Grizon et al. |
| 6,438,069 | B1 | 8/2002 | Ross et al. |

(Continued)

FOREIGN PATENT DOCUMENTS

| WO | WO 2006/054181 | 5/2006 |
|---|---|---|
| WO | WO 2008/140655 | 11/2008 |

OTHER PUBLICATIONS

Angelov, P. et al, (2004) "Pore Pressure and Water Saturation Variations—Modification of Landro's AVO Approach," *Expanded Abstracts: 74th Annual Meeting of the SEG*, 4 pgs.

(Continued)

*Primary Examiner* — Mark Hellner
*Assistant Examiner* — Ari M Diacou
(74) *Attorney, Agent, or Firm* — ExxonMobil Upstream Research Company

(57) ABSTRACT

A method including analyzing seismic data relating to a producing hydrocarbon reservoir is disclosed. The seismic data includes first and second sets of seismic data obtained at different times. An interval composed substantially of hard rock is identified in the hydrocarbon reservoir. 4D seismic attributes for the region are calculated. Rock physics relationships are applied to seismic data related to the interval according to the permeability associated therewith. A fluid saturation change or a pressure change of the interval is inferred based on outputs of the first or second sets of rock physics relationships and the calculated 4D attributes for the interval. The inferred fluid saturation change or pressure change of the interval is outputted.

19 Claims, 11 Drawing Sheets

U.S. PATENT DOCUMENTS

| | | | |
|---|---|---|---|
| 6,529,833 B2* | 3/2003 | Fanini et al. | 702/7 |
| 6,574,563 B1 | 6/2003 | Nickel | |
| 6,614,717 B1 | 9/2003 | Khan et al. | |
| 6,715,551 B2* | 4/2004 | Curtis et al. | 166/250.16 |
| 6,778,918 B2 | 8/2004 | Delhomme et al. | |
| 6,801,717 B1 | 10/2004 | Hofer | |
| 6,826,483 B1* | 11/2004 | Anderson et al. | 702/13 |
| 6,886,632 B2* | 5/2005 | Raghuraman et al. | 166/252.4 |
| 6,906,982 B2 | 6/2005 | Calvert | |
| 6,985,404 B2 | 1/2006 | Mallick | |
| 7,027,354 B2 | 4/2006 | Cole et al. | |
| 7,242,637 B2 | 7/2007 | Van Den Beukel et al. | |
| 7,516,016 B2* | 4/2009 | DeMartini et al. | 702/14 |
| 7,523,003 B2 | 4/2009 | Robertsson | |
| 7,577,061 B2 | 8/2009 | Williamson et al. | |
| 7,620,534 B2 | 11/2009 | Pita et al. | |
| 7,660,711 B2 | 2/2010 | Pita et al. | |
| 7,859,943 B2 | 12/2010 | Herwanger | |
| 7,991,554 B2* | 8/2011 | Calhoun et al. | 702/9 |
| 8,086,426 B2 | 12/2011 | El Ouair et al. | |
| 2002/0053430 A1* | 5/2002 | Curtis et al. | 166/250.01 |
| 2002/0128777 A1* | 9/2002 | Fanini et al. | 702/11 |
| 2004/0011524 A1* | 1/2004 | Raghuraman et al. | 166/252.4 |
| 2005/0149267 A1 | 7/2005 | VanDenBeukel et al. | 702/14 |
| 2006/0153005 A1 | 7/2006 | Herwanger et al. | |
| 2007/0255500 A1 | 11/2007 | Pita et al. | 702/11 |
| 2007/0255545 A1 | 11/2007 | Pita et al. | |
| 2008/0004847 A1 | 1/2008 | Bradford | |
| 2008/0170468 A1 | 7/2008 | Brain et al. | |
| 2008/0243447 A1* | 10/2008 | Roggero et al. | 703/1 |
| 2008/0294387 A1* | 11/2008 | Anderson et al. | 703/1 |
| 2009/0059720 A1* | 3/2009 | Heigl | 367/35 |
| 2010/0027377 A1* | 2/2010 | Zuercher | 367/73 |
| 2010/0142323 A1* | 6/2010 | Chu et al. | 367/73 |
| 2010/0206559 A1* | 8/2010 | Sequeira et al. | 166/250.15 |
| 2013/0030782 A1* | 1/2013 | Yogeswaren | 703/10 |

OTHER PUBLICATIONS

Batzle, M. et al. (2006) "Fluid Mobility and Frequency-Dependent Seismic Velocity—Direct Measurements," *Geophysics*, 71, No. 1, pp. N1-N9.

Biot, M. A. (1956) "Theory of Propagation of Elastic Waves in Fluid-Saturated Porous Solid. I. Low Frequency Range and II. Higher-Frequency Range," *J. Acoust. Soc. Am.*, 28, No. 2, pp. 168-191.

Dvorkin, J. et al. (1993) "Dynamic Poroelasticity: A Unified Model With the Squirt and the Biot Mechanisms," *Geophys.*, 58, No. 4, pp. 524-533.

Endres, A. L. et al. (1992) "A Theoretical Treatment of the Effect of Microscopic Fluid Distribution on the Dielectric Properties of Partially Saturated Rocks," *Geophys. Prospecting*, 40, pp. 307-324.

Han, D. et al. (2004) "Gassmann's Equation and Fluid-Saturation Effects on Seismic Velocities," *Geophysics*, 69, No. 2, pp. 398-405.

Hatchell, P. J. et al. (2005) "Measuring Reservoir Compaction Using Time-Lapse Timeshifts," *Expanded Abstracts: 75th Annual Meeting of the SEG*, pp. 2500-2504.

Knight, R. et al. (1990) "A Laboratory Study of the Dependence of Elastic Wave Velocities on Pore Scale Fluid Distribution," *Geopys. Res. Lett.*, 17, No. 10, pp. 1529-1532.

Landro, M., (2001) "Discrimination Between Pressure and Fluid Saturation Changes From Time-Lapse Seismic Data," *Geophysics*, 66, No. 3, pp. 836-844.

Landro, M. et al. (2004) "Quantitative Estimation of Compaction and Velocity Changes Using 4D Impedance and Traveltime Changes," *Geophysics*, 69, No. 4, pp. 949-957.

Lumley, D. E. et al. (2003) "Estimation of Reservoir Pressure and Saturations by Crossplot Inversion of 4D Seismic Attributes," *SEG*, 4 pgs.

Mavko, G. et al. (1975) "Melt Squirt in the Asthenosphere," *J. Geophys. Res.*, 80, No. 11, pp. 1444-1448.

Ribeiro, C. et al. (2004) "A Petroelastic-Based Approach to Pressure and Saturation Estimation Using 4D Seismic," *Expanded Abstracts: 74th Annual Meeting of the SEG*, Denver, CO, 4 pgs.

Tura, A. et al. (1998) "Subsurface Fluid-Flow Properties From Time-Lapse Elastic-Wave Reflection Data," *Proceedings of SPIE, Mathematical Methods in Geophysical Imaging V*, v.3453, pp. 125-138.

Johnston, D. H. et al. (1998) "Time-Lapse Seismic Analysis of Fulmar Field," *The Leading Edge*, v.17, No. 10, pp. 1420-1428.

Sarkar, S. et al. (2003), "On the inversion of time-lapse seismic data," *SEG Expanded Abstracts* 22, pp. 1489-1492.

\* cited by examiner

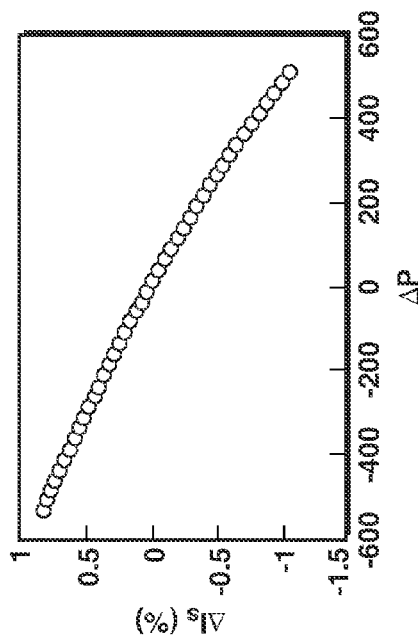
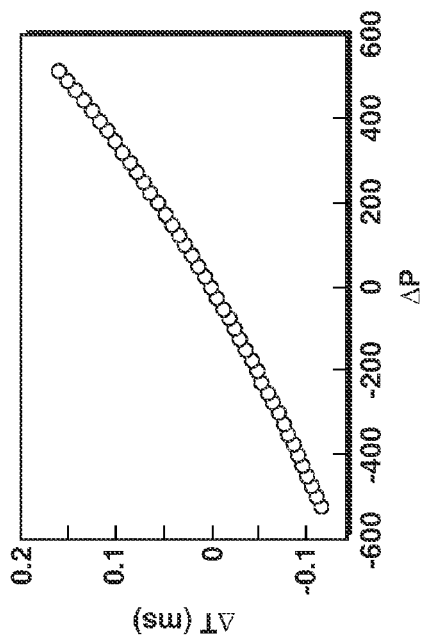
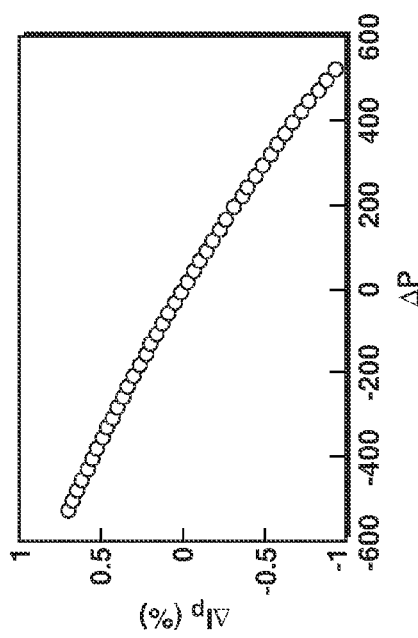
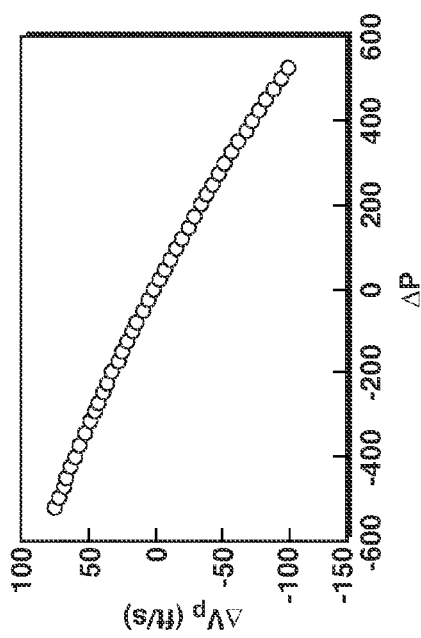
FIG. 8A
FIG. 8B
FIG. 8C
FIG. 8D

METHOD FOR DETERMINING THE FLUID/PRESSURE DISTRIBUTION OF HYDROCARBON RESERVOIRS FROM 4D SEISMIC DATA

CROSS-REFERENCE TO RELATED APPLICATIONS

This application claims the benefit of U.S. Provisional Patent Application Ser. No. 61/166,546 filed 3 Apr. 2009, the disclosures of which are hereby incorporated herein in their entirety by reference.

FIELD OF THE INVENTION

This invention relates generally to the field of interpretation of reservoir monitoring using time-lapse seismic measurements, and more specifically, to a method of predicting fluid and/or pressure change from 4D seismic data.

BACKGROUND OF THE INVENTION

This section is intended to introduce various aspects of the art, which may be associated with embodiments of the disclosed techniques and methodologies. A list of references is provided at the end of this section and may be referred to hereinafter. This discussion, including the references, is believed to assist in providing a framework to facilitate a better understanding of particular aspects of the disclosure. Accordingly, this section should be read in this light and not necessarily as admissions of prior art.

Reservoir surveillance during hydrocarbon reservoir production is a key to meeting goals of reduced operating costs and maximized recovery. Differences between actual and predicted performance are typically used to update the reservoir's geological model and to revise its depletion strategy. The changes in reservoir fluid saturation, pressure and temperature that occur during production also induce changes in the reservoir acoustic properties of rocks that under favorable conditions may be detected by seismic methods. One way to observe changes in properties in a hydrocarbon reservoir is to compare seismic returns measured at different times. The resultant gathered data is known as 4D seismic data.

For porous siliciclastic sands, seismic response is generally strong enough to detect fluid movement (Johnston et al., many others). Using different forms of approximations of the reflectivity equation and a rock physics model, a set of coefficients can be estimated to make a combination of near and far difference amplitudes, which in turn may infer the saturation and pressure change (Tura, et al, 1998; Landro, 2001; Lumley, et al, 2003, Ribeiro & MacBeth, 2004, Angelov et al, 2004). This type of formulation works well when physical properties of the reservoir, such as porosity (phi) and volume of shale (vsh), are relatively constant.

Seismic velocities change as hydrocarbon saturation change caused by production. The amount of the velocity change for a given saturation change depends on a number of factors, i.e. nature of the rock frame; fluid property; pore pressure, temperature of the reservoir, etc. These dependencies are well understood and are implemented in currently available commercial software for fluid substitutions to model/explain the fluid effect on seismic data. The scales at which the two fluids (e.g. oil and water) are mixed have an impact on the velocity change from experiment data (Knight and Nolen-Hoeksema, 1990, Endres and Knight, 1989) and theoretical derivations (Biot 1956, Mavko and Nur 1975, Stoll, 1989, Dvorkin and Nur, 1993). The mixing pattern of the two fluids is in turn influenced by the permeability at a given frequency (e.g. seismic frequency) (Batzle et al. 2006). For low permeability rocks, fluids can not move easily as in the higher permeability rock. Fluid moving through low permeability rock therefore has a higher chance of showing unpredictable or patchy behavior at frequency ranges associated with seismic surveys.

Time shift is the difference in two-way seismic travel times that are observed when analyzing seismic surveys conducted at different times. Time shifts can be attributed to two sources: 1) pore-fluid property changes that alter the velocity at which seismic signals pass through a layer or interval, and 2) changes in seismic velocity and layer thickness that occur both inside and outside of the layer or overall reservoir because of reservoir compaction and stress-strain redistribution in the surrounding formations. For a layer with thickness, z, the change in relative seismic travel time is (Landro and Stammeijer, 2004)

$$\Delta t/t = \Delta z/z - \Delta v/v \tag{1}$$

where t represents the two-way travel time across the layer and v is the velocity of the layer. Hatchell and Bourne (2005) has used time shifts to estimate the compaction of compacting reservoirs and layers within reservoirs by implicitly assuming the velocity change due to fluid is a minor component. However, compaction (as expressed by $\Delta z$) does not always contribute significantly to the time shifts, especially when reservoir rock is stiff or pressure is well maintained. In this case, the main contributing factor to an observed time shift will be the velocity change from either fluid change (such as saturation levels) or pressure change.

Separating the contributions from pressure change or saturation change is important to an effective 4D seismic model. He et al. (1998) has proposed to invert the 4D seismic data to impedance volumes and from there pressure and saturation change are inferred. Chu and Grant (2007) proposed a method to invert saturation and pressure directly from 4D seismic data by integrating well information, reserve simulation and 4D seismic data. However, when 4D signals are weak, such as in hard rock formations, a more model based methodology is desired.

An additional concern is that when a reservoir is thick, it may span a few cycles of seismic wave events, so that sidelobe energy may generate apparent difference events that can appear as real reservoir differences. This side-lobe energy complicates interpretation of multi-cycle hydrocarbon reservoirs where there is interference between reflectors. One proposed method to overcome this is to invert saturation and pressures changes at well locations using rock physics models and then populate the saturation and pressure changes in-between wells by statistical calibration methods. However, in hard rocks, such as carbonate rocks, seismic signals may not provide an adequate signal return to observe changes in hydrocarbon reservoir property values over time. What is needed is a method to optimally evaluate dynamic reservoir properties, such as saturation changes and pressure changes, under weak 4D signal scenarios generally encountered when dealing with hard rock formations.

The foregoing discussion of need in the art is intended to be representative rather than exhaustive. A technology addressing one or more such needs, or some other related shortcoming in the field, would benefit drilling and reservoir development planning, for example, providing decisions or plans for developing a reservoir more effectively and more profitably.

Reference material which may be relevant to the invention, and which may be referred to herein, include Angelov, P. et al, "Pore Pressure and Water Saturation Variations—Modification of Landro's AVO Approach," *Expanded Abstracts: 74th Annual Meeting of the SEG* (2004); Hatchell, P. J. et al., Measuring Reservoir Compaction Using Time-Lapse Timeshifts," *Expanded Abstracts: 75th Annual Meeting of the SEG* (2005); Landro, M., "Discrimination Between Pressure and Fluid Saturation Changes From Time-Lapse Seismic Data," *Geophysics*, 66, 836-844 (2001); Lumley, D. E. et al., "Estimation of Reservoir Pressure and Saturations by Crossplot Inversion of 4D Seismic (2003); Ribeiro, C. et al., "A Petroelastic-Based Approach to Pressure and Saturation Estimation Using 4D Seismic," *Expanded Abstracts: 74th Annual Meeting of the SEG* (2004); Tura, A. et al., "Subsurface Fluid Flow Properties From Time-Lapse Elastic Wave Reflection Data," *Proceedings of SPIE, Mathematical Methods in Geophysical Imaging V, V.* 3453, 125-138 (1998); Knight, R. et al., "A Laboratory Study of the Dependence of Elastic Wave Velocities on Pore Scale Fluid Distribution," *Geopys. Res. Lett.*, 14, 1529-1532 (1990); Endres, A. L. et al., "A Theoretical Treatment of the Effect of Microscopic Fluid Distribution on the Dielectric Properties of Partially Saturated Rocks," *Geophys. Prospecting*, 40, 307-324 (1992); Biot, M. A., "Theory of Propagation of Elastic Waves in Fluid Saturated Porous Solid, I. Low Frequency Range and II. Higher-Frequency Range," *J. Acoust. Soc. Am.*, 28, 168-191 (1956); Mavko, G. et al., "Melt Squirt in the Asthenosphere," *J. Geophys. Res.*, 80, 1444-1448 (1975); Stoll, R. D. "Sediment Acoustics," Springer Verlag, Berlin, 154, (1989); Dvorkin, J. et al., "Dynamic Poroelasticity: A Unified Model With the Squirt and the Biot Mechanisms," *Geophys.*, 58, 524-533, (1993); Batzle, et al., "Fluid Mobility and Frequency-Dependent Seismic Velocity—Direct Measurements," *Geophysics*, 71, N1-N9, (2006); Landro, M. et al., "Quantitative Estimation of Compaction of Velocity Changes Using 4D Impedance and Traveltime Changes," *Geophysics*, 69, 949-957, (2004); U.S. Pat. No. 5,798,982; PCT Patent Application No. PCT/US08/03830, Inversion of 4D Seismic Data, with inventors Chu, D. et al.

SUMMARY OF THE INVENTION

A method is disclosed including analyzing seismic data related to a hydrocarbon reservoir containing hard rock. The seismic data includes a first set of seismic data taken at a first time and a second set of seismic data taken at a second, subsequent time. An interval in the hydrocarbon reservoir composed substantially of hard rock is identified. The interval has a permeability level associated therewith. 4D seismic attributes for the interval are calculated. A first set of rock physics relationships are applied to seismic data related to the interval when the permeability level associated therewith is in a first permeability range. A second set of rock physics relationships is applied to seismic data related to the interval when the permeability level associated therewith is in a second permeability range. The first and second ranges are non-overlapping. A fluid saturation change or a pressure change of the interval are inferred based on the rock physics relationships from 4D seismic attributes. The inferred fluid saturation change or pressure change of the interval is outputted.

According to aspects of the disclosed techniques and methodologies, the interval may be a first interval. An additional interval or intervals composed substantially of hard rock in the reservoir may be defined. Each additional interval or intervals has a permeability level associated therewith. Steps of calculating, applying, inferring, and outputting may be repeated for the additional interval or intervals. According to another aspect, an output of a reservoir simulation model may be verified using the fluid saturation change or the pressure change of the interval. The reservoir simulation model may be revised so that prediction from the simulation model is consistent with the fluid saturation change and the pressure change calculated from 4D seismic and selected rock physical relationships. The corrected output or the verified output of the reservoir simulation model may be outputted. Hydrocarbon extraction activity may be conducted based on the output of at least one of the fluid saturation change and the pressure change of the interval computed from the outputs of the one of the rock physics relationships and the 4D seismic attributes for the interval. The first set of rock physics relationships may include an equation to determine a bulk modulus of fluid in the interval using a harmonic (e.g., Voigt) average or an arithmetic (e.g., Reuss) average. The components of the fluid may include at least two of gas, oil, and water. Seismic data may include one or more of co-processing the seismic data to maintain maximum repeatability, preserving time shifts between the second and first sets of seismic data, making time alignments to the seismic data, cross-equalizing the seismic data, and retaining derivative volumes. At least one of the 4D seismic attributes may describe a change over time of a characteristic of the interval. One of the 4D seismic attributes may be an amplitude of a returning seismic signal, or a change over time of such an amplitude. One of the 4D seismic attributes may be a time shift. The second set of seismic data may relate to the hydrocarbon reservoir at least one additional time.

In another aspect, a method is provided including defining a plurality of non-overlapping subsurface intervals in a hydrocarbon reservoir, each subsurface interval being composed primarily of hard rock. 4D seismic data related to each of the subsurface intervals are analyzed separately. The 4D seismic data include base seismic data and monitor seismic data. Seismic attributes for each of the subsurface intervals are calculated. Rock physics relationships are applied to the 4D seismic data related to each of the subsurface intervals based upon a permeability level for each subsurface interval. A fluid saturation change of each of the subsurface intervals is inferred based on the rock physics relationships and seismic attributes of each of the subsurface intervals. Outputs of the hydrocarbon reservoir simulation model are verified using the inferred fluid saturation change of each of the subsurface intervals. The hydrocarbon reservoir simulation model is modified according to the inferred fluid saturation change of each of the subsurface intervals. The verified model or the modified model is outputted.

Aspects of the disclosed techniques and methodologies may also include conducting hydrocarbon extraction activity based on the output from the modified reservoir simulation model. The rock physics relationships may include an equation to determine a bulk modulus of fluid in the interval using a harmonic average of bulk moduli of components in the fluid when permeability in a subsurface interval is less than a first predetermined amount, and an arithmetic average of bulk moduli of the fluid components when the permeability in a subsurface interval is greater than a second predetermined amount. The seismic attributes may include an amplitude of a returning seismic signal, a change over time of an amplitude of a returning seismic signal, and a time shift.

Also disclosed is a method of extracting hydrocarbons from a subsurface reservoir. According to the method, Seismic data relating to a hydrocarbon reservoir containing hard rock is analyzed. The seismic data includes a first set of seismic data relating to the hydrocarbon reservoir at a first time and a second set of seismic data relating to the hydrocarbon reservoir at a second time. An interval composed substantially of hard rock in the hydrocarbon reservoir is defined. The interval has a permeability value associated therewith. 4D seismic attributes for the interval are calculated. A first set of rock physics relationships are applied to seismic data related to the interval when the permeability associated therewith is in a first range. A second set of rock physics relationships is applied to seismic data related to the interval when the permeability associated therewith is in a second range. The first and second ranges are non-overlapping. A fluid saturation change or a pressure change of the interval is inferred based on outputs of the first or second sets of rock physics relationships and the calculated 4D seismic attributes for the interval. An output of a reservoir simulation model is verified using the fluid saturation change or the pressure change of the interval. The reservoir simulation model is revised so that a prediction from the simulation model is consistent with the fluid saturation change and the pressure change calculated from 4D seismic and selected rock physical relationships. The revised output of the reservoir simulation model or the verified output of the reservoir simulation model is outputted. Hydrocarbons are extracted from the subsurface reservoir based on the outputted revised output or the verified output.

Further disclosed is a computer program product having computer executable logic recorded on a tangible computer readable medium. The computer program product includes: code for defining a subsurface interval as being composed primarily of hard rock; code for analyzing 4D seismic data related to the subsurface interval, the 4D seismic data including base seismic data and monitor seismic data; code for calculating seismic attributes for the subsurface interval; code for applying rock physics relationships to the 4D seismic data related to the subsurface interval based upon a permeability level of the subsurface interval; code for inferring a fluid saturation change of the subsurface interval based on at least one of the rock physics relationships and the seismic attributes of the subsurface interval; code for verifying an output of a hydrocarbon reservoir simulation model using the inferred fluid saturation change; code for correcting the hydrocarbon reservoir simulation model when said output is inconsistent with the inferred fluid saturation change; and code for outputting the verified output or the corrected output.

BRIEF DESCRIPTION OF THE DRAWINGS

The foregoing and other advantages may become apparent upon reviewing the following detailed description and drawings of non-limiting examples of embodiments in which

FIGS. 8A-8D are charts showing the expected effect of pore pressure change for a low permeability rock formation;

Figure 1:
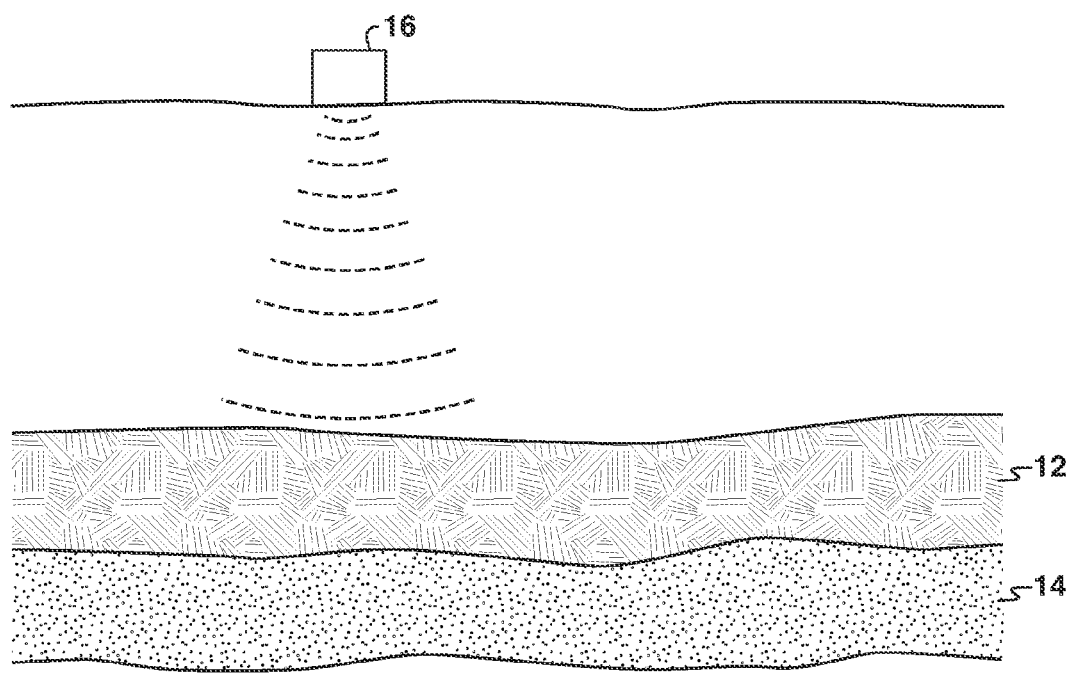
FIG. 1 is a cross-sectional view of the earth showing layers or intervals of differing permeabilities.

To the extent that the following detailed description is specific to a particular embodiment or a particular use of the disclosed techniques, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF PREFERRED EMBODIMENTS

Some portions of the detailed description which follows are presented in terms of procedures, steps, logic blocks, processing and other symbolic representations of operations on data bits within a memory in a computing system or a computing device. These descriptions and representations are the means used by those skilled in the data processing arts to most effectively convey the substance of their work to others skilled in the art. In this detailed description, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

Unless specifically stated otherwise as apparent from the following discussions, terms such as "analyzing", "identifying", "calculating", "applying", "inferring", "outputting", "defining", "completing", "verifying", "revising", "co-processing", "preserving", "making", "cross-equalizing", "retaining", "modifying", "revising", or the like, may refer to the action and processes of a computer system, or other electronic device, that transforms data represented as physical (electronic, magnetic, or optical) quantities within some electrical device's storage into other data similarly represented as physical quantities within the storage, or in transmission or display devices. These and similar terms are to be associated with the appropriate physical quantities and are merely convenient labels applied to these quantities.

Embodiments disclosed herein also relate to an apparatus for performing the operations herein. This apparatus may be specially constructed for the required purposes, or it may comprise a general-purpose computer selectively activated or reconfigured by a computer program or code stored in the computer. Such a computer program or code may be stored or encoded in a computer readable medium or implemented over some type of transmission medium. A computer-readable medium includes any medium or mechanism for storing or transmitting information in a form readable by a machine, such as a computer ('machine' and 'computer' are used synonymously herein). As a non-limiting example, a computer-readable medium may include a computer-readable storage medium (e.g., read only memory ("ROM"), random access memory ("RAM"), magnetic disk storage media, optical storage media, flash memory devices, etc.). A transmission medium may be twisted wire pairs, coaxial cable, optical fiber, or some other suitable transmission medium, for transmitting signals such as electrical, optical, acoustical or other form of propagated signals (e.g., carrier waves, infrared signals, digital signals, etc.)).

Furthermore, modules, features, attributes, methodologies, and other aspects can be implemented as software, hardware, firmware or any combination thereof. Wherever a component of the invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the invention is not limited to implementation in any specific operating system or environment.

Various terms as used herein are defined below. To the extent a term used in a claim is not defined below, it should be given the broadest possible definition persons in the pertinent art have given that term as reflected in at least one printed publication or issued patent.

As used herein, "4D" refers to time-lapse seismic surveying that takes into account 4-dimensional seismic returns, wherein time between acquisitions represents a fourth data dimension. The three other dimensions relate to the spatial characteristics of the earth formation, two being horizontal length dimensions, and the third relating to depth in the earth formation, which can be represented by a length coordinate, or by a time coordinate such as the two-way travel time of a seismic wave from surface to a certain depth and back. A 4D seismic survey (or 4D seismic) models alterations in geological or geophysical characteristics of a given interval of the earth by comparing data corresponding to seismic surveys carried out at different times.

As used herein, "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined.

As used herein, "base seismic survey" and "monitor seismic survey" designate seismic surveys of the reservoir taken at different times. The assumption is that the base survey is carried out earlier in time than the monitor survey.

As used herein, "displaying" includes a direct act that causes displaying, as well as any indirect act that facilitates displaying. Indirect acts include providing software to an end user, maintaining a website through which a user is enabled to affect a display, hyperlinking to such a website, or cooperating or partnering with an entity who performs such direct or indirect acts. Thus, a first party may operate alone or in cooperation with a third party vendor to enable the reference signal to be generated on a display device. The display device may include any device suitable for displaying the reference image, such as without limitation a CRT monitor, a LCD monitor, a plasma device, a flat panel device, or printer. The display device may include a device which has been calibrated through the use of any conventional software intended to be used in evaluating, correcting, and/or improving display results (e.g., a color monitor that has been adjusted using monitor calibration software). Rather than (or in addition to) displaying the reference image on a display device, a method, consistent with the invention, may include providing a reference image to a subject. "Providing a reference image" may include creating or distributing the reference image to the subject by physical, telephonic, or electronic delivery, providing access over a network to the reference, or creating or distributing software to the subject configured to run on the subject's workstation or computer including the reference image. In one example, the providing of the reference image could involve enabling the subject to obtain the reference image in hard copy form via a printer. For example, information, software, and/or instructions could be transmitted (e.g., electronically or physically via a data storage device or hard copy) and/or otherwise made available (e.g., via a network) in order to facilitate the subject using a printer to print a hard copy form of reference image. In such an example, the printer may be a printer which has been calibrated through the use of any conventional software intended to be used in evaluating, correcting, and/or improving printing results (e.g., a color printer that has been adjusted using color correction software).

As used herein, "hard rock" means any stiff reservoir rock characterized by high velocity and high density. In other words, hard rock means rocks whose acoustic response is controlled primarily by the rock frame and is relatively insensitive to fluid saturation change and pressure change due to hydrocarbon production. Non-limiting examples of hard rock include various carbonate or carbonate-type rocks and deep siliciclastic rocks.

As used herein, "hydrocarbon reservoirs" include reservoirs containing any hydrocarbon substance, including for example one or more than one of any of the following: oil (often referred to as petroleum), natural gas, gas condensate, tar and bitumen. The following detailed description of various embodiments is presented with primary reference to subsurface oil reservoirs, but the principles discussed apply also to situations involving reservoirs containing other hydrocarbon materials, either in addition to oil or instead of oil.

As used herein, "impedance" is the product of seismic velocity and the density of a rock formation. Impedance, also called acoustic impedance, will typically vary among different rock layers. Impedance associated with compression waves, or P-waves, is called P-impedance. Impedance associated with shear waves, or S-waves, is called S-impedance.

As used herein, "interval" is a geologic region or layer.

As used herein, "machine-readable medium" refers to a medium that participates in directly or indirectly providing signals, instructions and/or data. A machine-readable medium may take forms, including, but not limited to, non-volatile media (e.g. ROM, disk) and volatile media (RAM). Common forms of a machine-readable medium include, but are not limited to, a floppy disk, a flexible disk, a hard disk, a magnetic tape, other magnetic medium, a CD-ROM, other optical medium, punch cards, paper tape, other physical medium with patterns of holes, a RAM, a ROM, an EPROM, a FLASH-EPROM, or other memory chip or card, a memory stick, and other media from which a computer, a processor or other electronic device can read.

As used herein, "permeability" is a measure of the ability of a rock formation to transmit fluids. It is related directly to the connections (pore throats) between the spaces (pore spaces) of rock grains of a formation. These connections allow the fluids to move through the formation.

As used herein, a "permeability level" may be a single permeability value or a range of permeability values.

As used herein, "rock" includes various geological materials that may be encountered during drilling operations, e.g., salt, clay, shale, sand and the like, in addition to those materials more formally classified as "rocks."

As used herein, "rock physics model" relates petrophysical and production-related properties to the bulk elastic properties of a rock formation. Examples of petrophysical and production-related properties may include, but are not limited to, porosity, pore geometry, pore connectivity, volume of shale or clay, estimated overburden stress or related data, pore pressure, fluid type and content, fluid and/or gas saturation, clay content, mineralogy, temperature, and anisotropy.

As used herein, "seismic data" refers to information collected from a seismic survey. Seismic data is typically processed using procedures such as filtering, multiple removal, muting, stacking, and migration.

As used herein, "seismic survey" means a program for mapping geologic structure by observation of seismic waves, especially by creating seismic waves with artificial sources and observing the arrival times and amplitudes of the waves reflected from acoustic-impedance contrasts (representing rock formation interfaces, for example) or refracted using techniques known in the art.

As used herein, "siliciclastic rock" means rock composed of fragments or portions of silicates. For example, sandstone is a siliciclastic rock.

FIG. 1 depicts a cross-section view of the earth, specifically depicting a plurality of subsurface layers or intervals of hard rock such as carbonate rock. Although many such layers can be present, for ease of describing the invention only a first and second layer 12, 14 will be specifically described. Each of the first and second layers is defined by the hardness and/or stiffness of the rock in the respective layer, as well as the fluid permeability of the respective layer. Although for a specific rock type, e.g., sandstone, hardness/stiffness and permeability may be somewhat related, layers of similar hardness/stiffness may have different permeabilities. In the example shown in FIG. 1, first layer 12 is a hard rock layer having a high permeability level, and second layer 14 is a hard rock layer having a low permeability level. The terms "high" and "low" are relative terms and are not necessarily designed to represent absolute permeability values or ranges. However, to explain the invention a high permeability level may be defined as being greater than 50 millidarcies, and a low permeability level may be defined as being less than 10 millidarcies. High and low permeability levels may be otherwise defined depending on values observed for different subsurface layers. A seismic source 16 performs a seismic survey according to known techniques and collects seismic data. Seismic source 16 may perform a base seismic survey and one or more monitor seismic surveys. Together the based seismic survey and the monitor seismic survey(s) are used to create a 4D seismic survey. As previously explained, 4D signal returns for hard rocks, such as carbonate rocks, are small relative to the 4D signal returns for shallow siliciclastic rocks. These complexities may be addressed by predicting how saturation changes and pressure changes affect 4D signal returns in hard rock formations.

Different rock physics models may be employed according to the permeability of a hard rock formation to predict sensitivity of seismic attributes to saturation or pressure change before seismic attributes are used to predict saturation or pressure changes. Specifically, a feature of the disclosed methodologies is predicting where pressure changes or saturation changes dominate 4D signal returns, and using appropriate 4D signal attributes to infer prospective changes. Interpreting weak 4D signal returns is improved by using permeability-dependent rock physics models. The seismic attributes for detecting saturation or pressure change are optimized. Detection limits for a given 4D signal return can also be identified.

Since fluid response to seismic signals differs with different permeability and rock type, another aspect of the invention is dividing hard rock formations into different intervals according to relative permeability levels, and then extracting seismic attributes for each interval. The seismic attributes may include various descriptions of amplitudes, such as maximum/minimum/average amplitudes of seismic returns corresponding to the interval, etc. Attributes can be calculated separately using a base seismic survey and a monitor seismic survey, and the differences can be used to create a 4D attribute. For example, one attribute that may be used is the maximum amplitude ($A_{max}$) of the returns from a seismic survey. The difference between the returns (diff$A_{max}$) from the monitor seismic survey and the base seismic survey is a useful 4D attribute. $A_{max}$, as with other amplitude based attributes, is a measure of impedance, which in turn is a function of velocity and rock density, and can be used to demonstrate viability of aspects of disclosed techniques.

Another type of attribute that may be calculated from 4D seismic data is a time shift. A time shift variable $\Delta T$ caused by fluid saturation change and pressure change in a rock formation can be defined as follows:

$$\Delta T = dt2 - dt1 \qquad (2)$$

In Equation 2, dt1 and dt2 are time shift variables at different levels of the reservoir. The time shift variable dt2 represents the difference in time between the seismic returns representing a geologic feature at the base of a divided hydrocarbon reservoir interval as measured at the monitor seismic survey and the base seismic survey. The time shift variable dt1 represents the difference in time between the seismic returns representing a geologic feature at the top of the hydrocarbon reservoir interval as measured at the monitor seismic survey and the base seismic survey. $\Delta T$ is an approximate measure of velocity change of seismic signals within a hydrocarbon reservoir of interest.

Figure 2A:
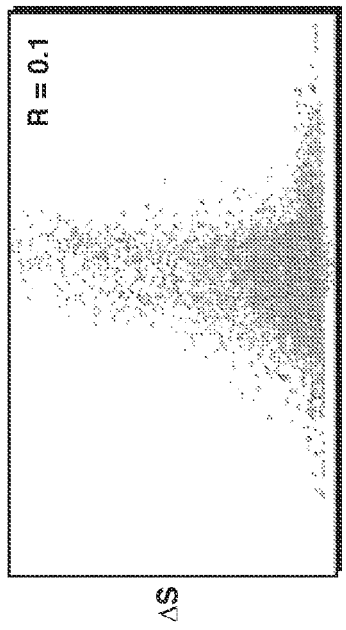
FIGS. 2A-2D are plots showing 4D seismic attributes versus outputs (saturation and pressure change) from reservoir simulation for a high permeability rock formation.
Figure 2B:
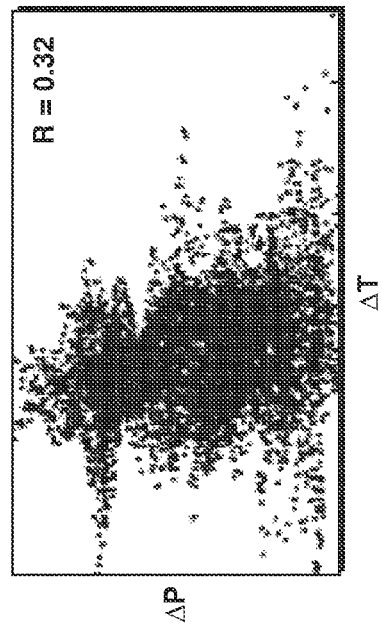
Figure 2C:
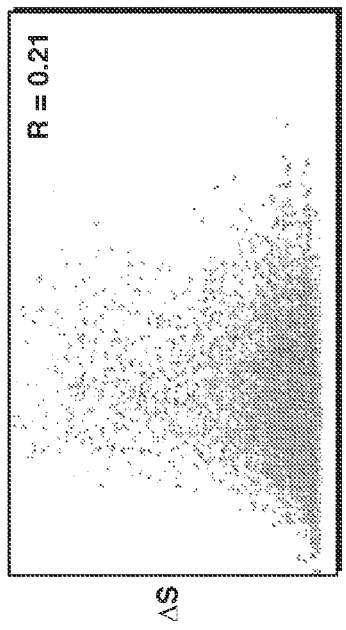
Figure 2D:
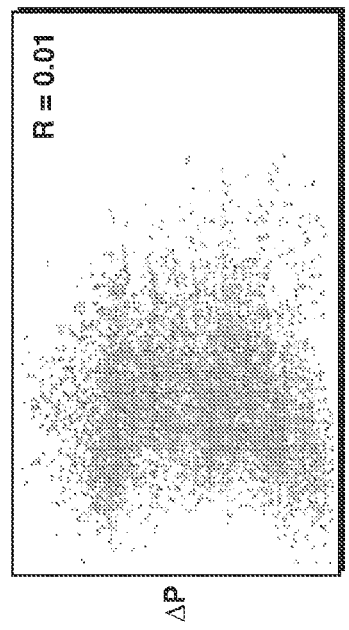
Figure 3A:
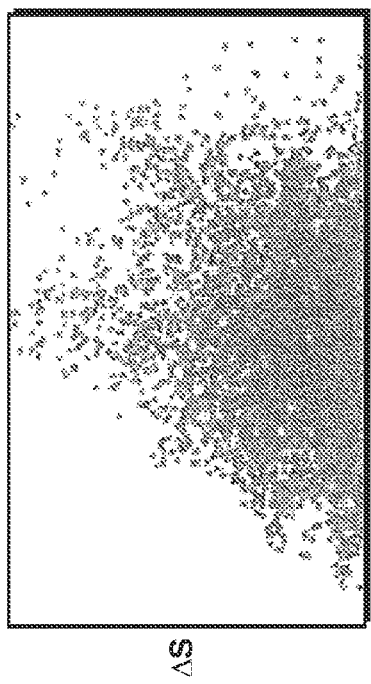
FIGS. 3A-3D are plots showing 4D seismic attributes versus outputs (saturation and pressure change) from reservoir simulation for a low permeability rock formation.
Figure 3B:
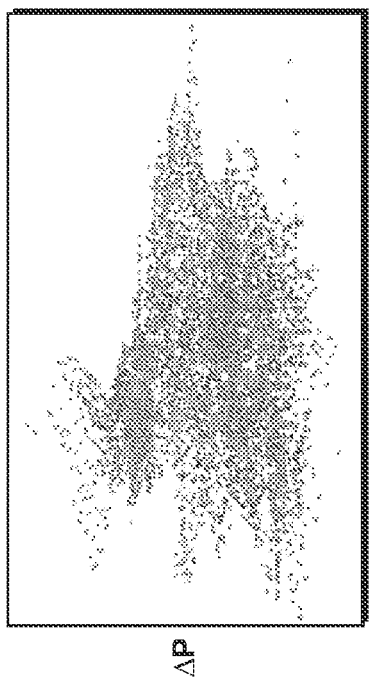
Figure 3C:
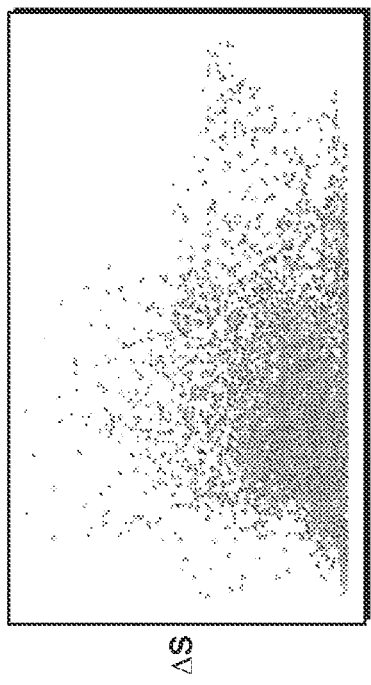
Figure 3D:
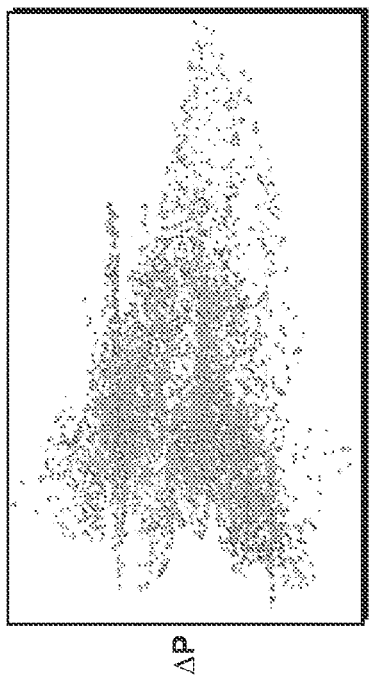

Reservoir simulation may not always capture accurate fluid movement through a reservoir. However, reservoir models do have a certain level of accuracy after history matching to many wells in a mature hydrocarbon reservoir. If 4D seismic data and the seismic attributes derived from them accurately reflect the fluid saturation and/or pressure change in the reservoir, the data and attributes should correlate with reservoir simulation outputs to a certain degree. FIGS. 2A-2D are plots correlating outputs from a reservoir simulation of a high permeability (i.e., greater than 50 millidarcies) carbonate rock formation with 4D attributes. Correlation coefficient R is indicated in each drawing. Specifically, FIGS. 2A and 2B show saturation change as a function of diff$A_{max}$ and $\Delta T$, respectively. FIGS. 2C and 2D show pressure change as a function of diff$A_{max}$ and $\Delta T$, respectively. These correlation results can be compared with FIGS. 3A-3D, which are plots correlating outputs from a reservoir simulation of a low permeability (i.e., less than about 10 millidarcies) carbonate rock formation with 4D attributes. FIGS. 3A and 3B show saturation change as a function of diff$A_{max}$ and $\Delta T$, and FIGS. 3C and 3D show pressure change as a function of diff$A_{max}$ and $\Delta T$, respectively. These plots show that diff$A_{max}$ correlates better to saturation change (FIGS. 2A and 3A) than to pressure change (FIGS. 2C and 3C) for both the high and low permeability formations. In fact, FIGS. 2C and 3C show that diff$A_{max}$ has little correlation to pressure change in both the high and low permeability formations. The situation is different for $\Delta T$. In the high permeability layer, $\Delta T$ correlates better with pressure change (FIG. 2D) than with saturation change (FIG. 2B). In the low permeability layer, $\Delta T$ correlates better with saturation change (FIG. 3B) than with pressure change (FIG. 3D). The correlation between ΔT and saturation change in the high permeability formation is very poor (FIG. 2B), as is the correlation between ΔT and pressure change in the low permeability interval.

It will be understood from the preceding description, including the Background section, that the present inventive method is not limited to rocks of at least a certain hardness. Instead, the significance of rock hardness to the present invention is that the value of the invention is greatest when applied to "hard" rocks because other methods have difficulties with the weak 4D seismic data characteristic of hard rocks.

Figure 4:
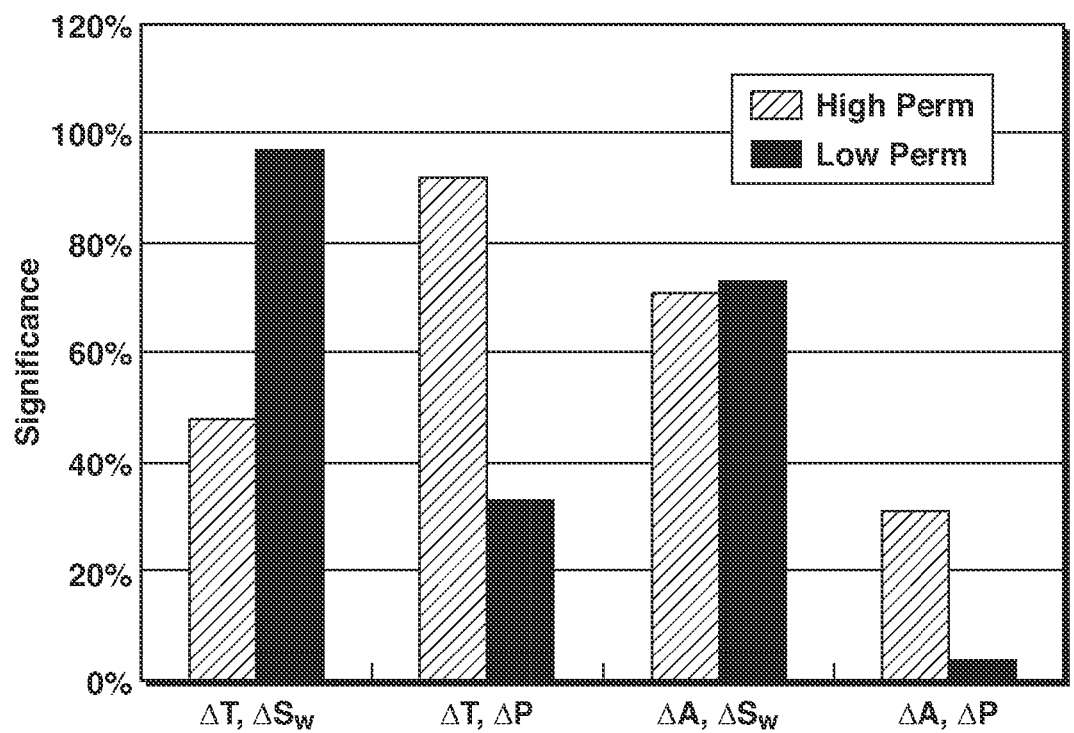
FIG. 4 is a graph showing statistical significance of the correlations of attributes versus saturation change and pressure change in FIG. 2 and FIG. 3.

FIG. 4 shows a Monte Carlo significance test of various combinations of variables to determine whether the correlations shown in FIGS. 2A-D and FIGS. 3A-D are statistically meaningful. FIG. 4 shows that while the correlation of ΔT with pressure change in the high permeability interval is statistically significant (greater than 90% confidence level), the correlation of ΔT with saturation change in the low permeability interval is significant. The Monte Carlo significance test also shows that diff$A_{max}$ may provide useful information about saturation change for both the high and low permeability intervals, although with a lower degree of confidence.

Seismic modeling is used to guide the interpretation of attributes in response to pressure and saturation changes for analyzed intervals with different permeability levels.

To model the effect of pressure on seismic wave velocity within a hard rock formation, the effect of pressure on density is ignored and empirical relationships for P-wave velocity $V_p$ and S-wave velocity $V_s$ are used. For $V_p$ in terms of pressure P, $$V_p = V_{p,\infty}\left(1 - Ae^{\frac{-P}{P_{p,0}}}\right) \quad (3)$$

Here, $V_{p,\infty}$ is a high-pressure limiting velocity and is correlated with porosity and mineralogy; A is the fractional velocity change for pressure change from 0 to high pressure; A correlates with porosity; $P_{p,0}$ is a pressure scalar that is roughly constant for hard rock, i.e., independent of porosity. Similarly, the empirical relationship for $V_s$ can be expressed as $$V_s = V_{p,\infty}\left(1 - Ae^{\frac{-P}{P_{p,0}}}\right) \quad (4)$$

To model the effect of saturation, the Gassmann fluid substitution equation is used to determine elastic parameters for a given saturation state with gas saturation $S_g$, oil saturation $S_o$ and water saturation $S_w$. For a given porosity φ, an overall density of a rock formation can be calculated through $$\rho=(1-\phi)\rho_s+\phi\rho_f \text{ and } \rho_f=\rho_o S_o+\rho_g S_g+\rho_w S_w \quad (5)$$

where $\rho_s$ is the density for solid rock, $\rho_f$ is the density for mixed fluid, $\rho_o$ is the density of oil, $\rho_g$ is the density of gas and $\rho_w$ is density of water. The bulk modulus K for a rock formation is calculated by $$K = K_{dry} + \frac{\left(1 - \frac{K_{dry}}{K_s}\right)^2}{\frac{\phi}{K_f} + \frac{1-\phi}{K_s} - \frac{K_{dry}}{K_s^2}} \quad (6)$$

where $K_{dry}$ is the bulk modulus of the dry rock frame, i.e., when the rock formation has no fluid in its pore space; $K_{dry}$ is called the dry bulk modulus; $K_s$ is the bulk modulus of the mineral material that makes up the rock; $K_f$ is the bulk modulus of the fluid in the pore space of the rock formation. To obtain $K_f$ for a given reservoir fluid, it is assumed that the saturation levels of the various fluid components of oil, gas and water ($S_o$, $S_g$ and $S_w$, respectively) are known, and that the bulk moduli of oil, gas, and water ($K_g$, $K_o$ and $K_w$, respectively) are also known. According to the invention, the bulk modulus for the reservoir fluid mixture is determined by the level of permeability of the rock formation. If the permeability level of the rock formation is high, a fluid mixing scheme known as Reuss averaging is used. With Reuss averaging, the bulk modulus of the mixed fluid $K_f$ is given by a harmonic average of the component bulk moduli ($K_g$, $K_o$ and $K_w$):

$$\frac{1}{K_f} = \frac{S_g}{K_g} + \frac{S_o}{K_o} + \frac{S_w}{K_w} \quad (7)$$

If the permeability level of the rock formation is low, a fluid mixing scheme known as the Voigt averaging is used. With Voigt averaging, the bulk modulus for the mixed fluid is given by an arithmetic average of the component bulk moduli:

$$K_f = S_g K_g + S_o K_o + S_w K_w \quad (8)$$

Figure 5:
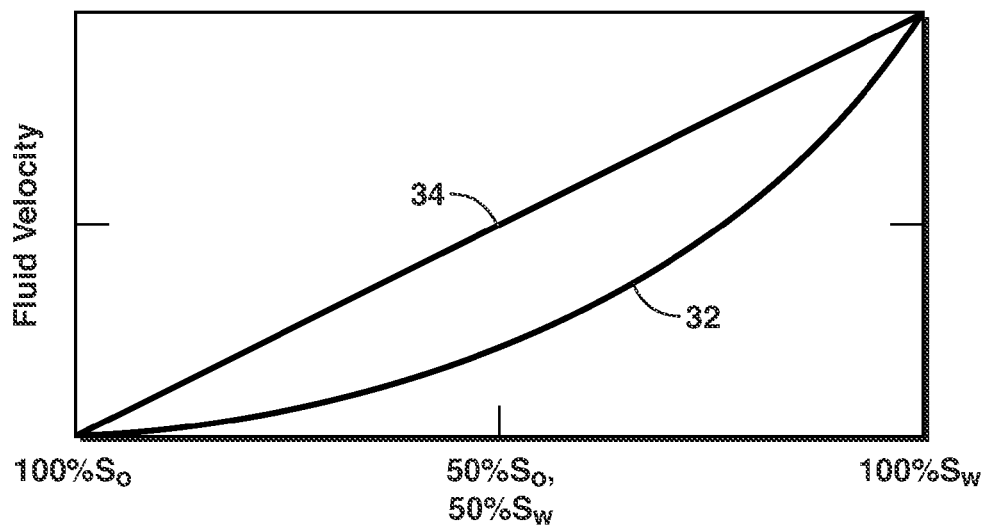
FIG. 5 is a plot showing outputs of different fluid mixing schemes.

FIG. 5 shows the two mixing schemes as a function of oil saturation $S_o$ and water saturation $S_w$. The vertical axis indicates fluid velocity. The Reuss average mixing scheme, indicated at 32, provides the lower bound for the bulk modulus of the mixed fluid $K_f$. The Voigt average mixing scheme, indicated at 34, provides the upper bound. Physically, Reuss averaging is equivalent to a fluid mixture in which all different types of reservoir fluids are fully mixed; in contrast, Voigt averaging is equivalent to a fluid mixture in which all different kinds of fluids are completely separated (patchy saturation). When permeability in a rock formation is high, the reservoir fluids reach equilibrium quickly and become fully mixed in the 4D seismic survey time scale. In this case, the Reuss average mixing scheme is used to compute the bulk modulus of the mixed fluid for use in analyzing the 4D seismic data. On the other hand, when permeability in a rock formation is low, a longer time is required for the fluid to reach equilibrium. In other words, the time spanned by 4D seismic survey is too short for the reservoir fluids to be fully mixed. Consequently, different reservoir fluids separate from each other and form patchy saturation. In this situation (low permeability rock formation), the Voigt average mixing scheme is used to compute the bulk modulus of the mixed fluid. It is also possible the resultant fluid bulk modulus is a combination of the two averages.

Figure 6A:
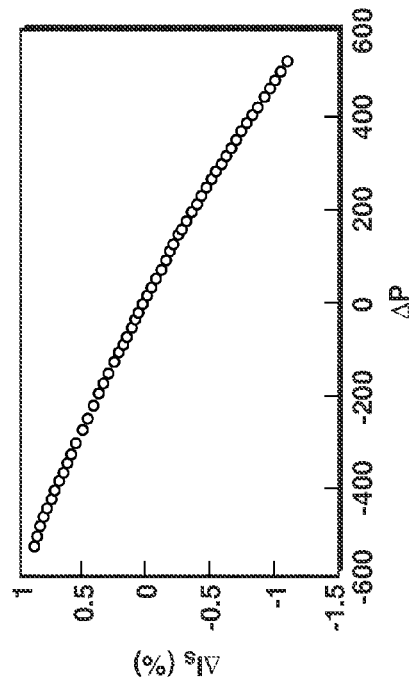
FIGS. 6A-6D are charts showing the expected effect of pore pressure change for a high permeability rock formation.
Figure 6B:
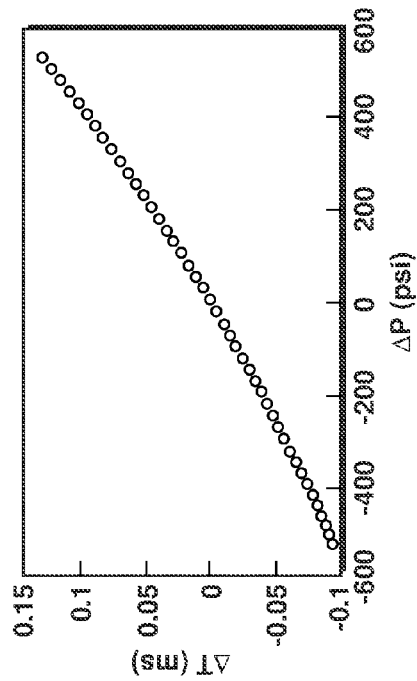
Figure 6C:
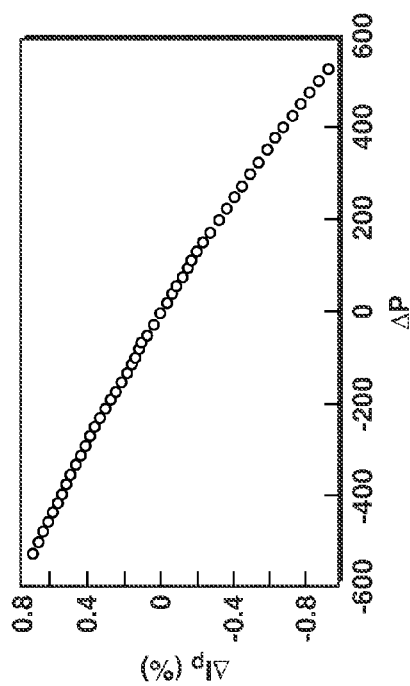
Figure 6D:
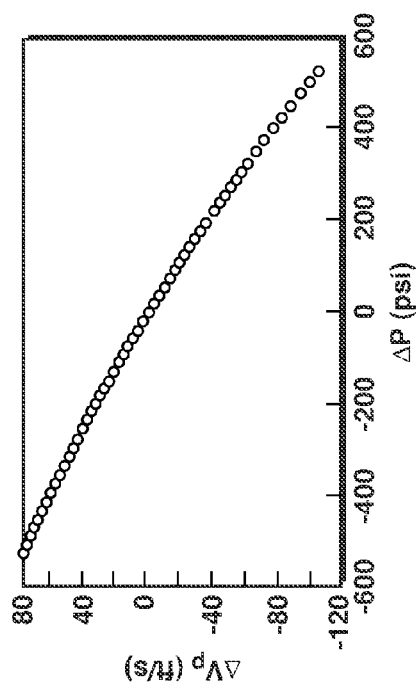
Figure 7A:
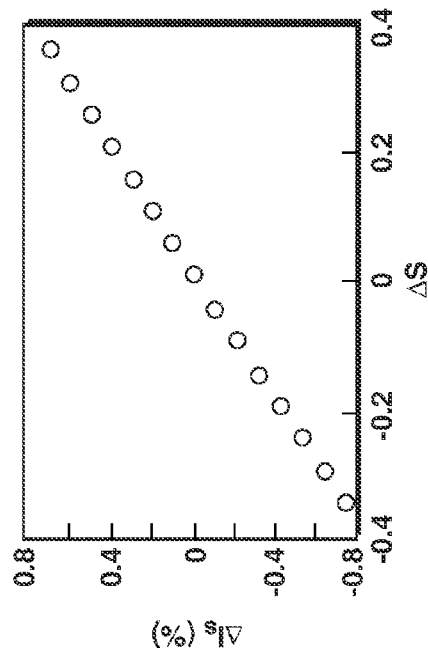
FIGS. 7A-7D are charts showing the expected effect of pore saturation change for a high permeability rock formation.
Figure 7B:
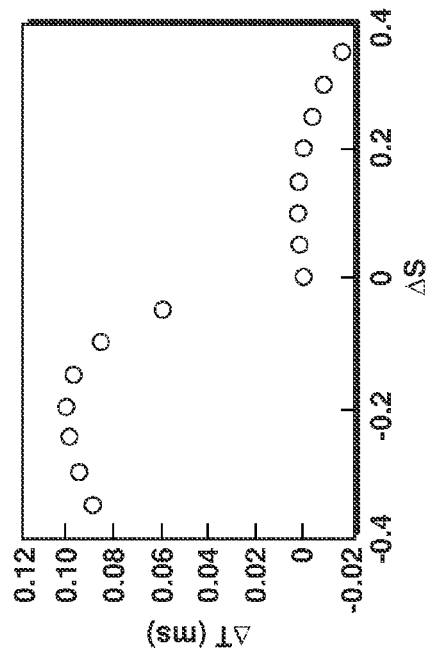
Figure 7C:
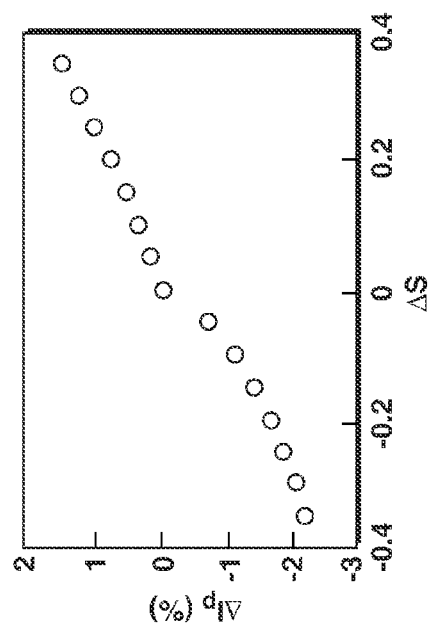
Figure 7D:
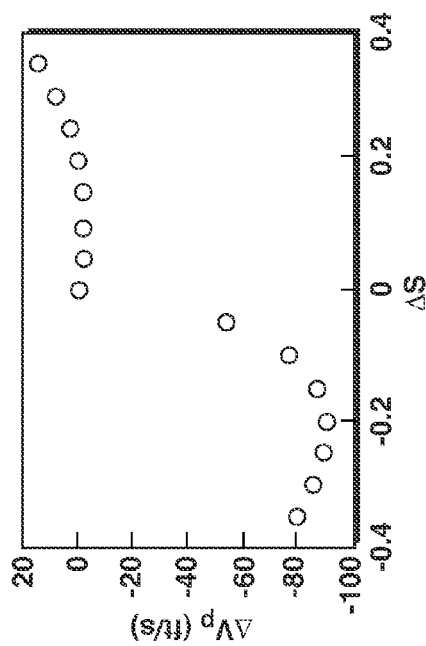
Figure 9A:
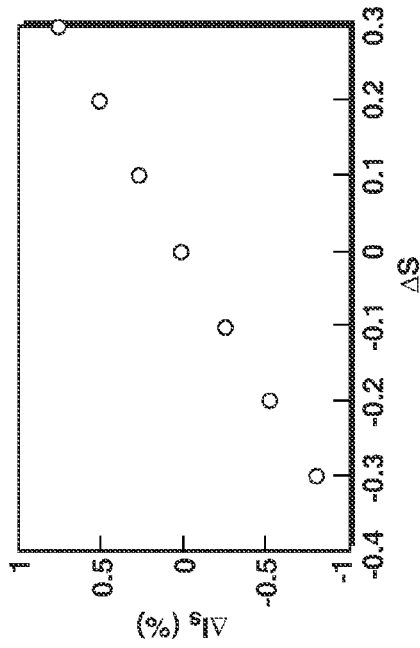
FIGS. 9A-9D are charts showing the expected effect of pore saturation change for a low permeability rock formation assuming uniform fluid saturation distribution.
Figure 9B:
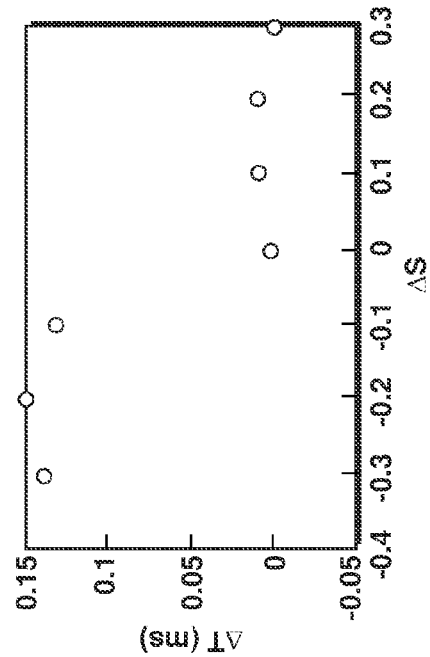
Figure 9C:
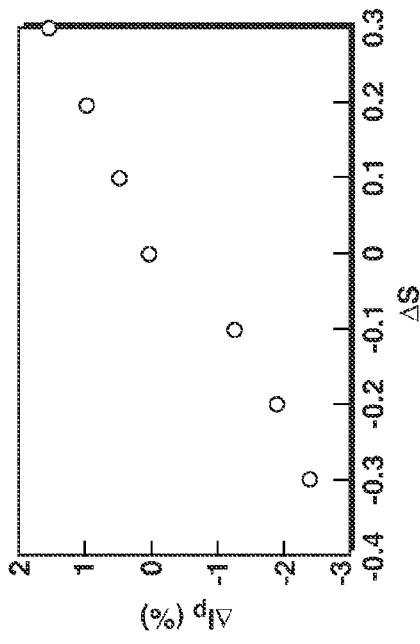
Figure 9D:
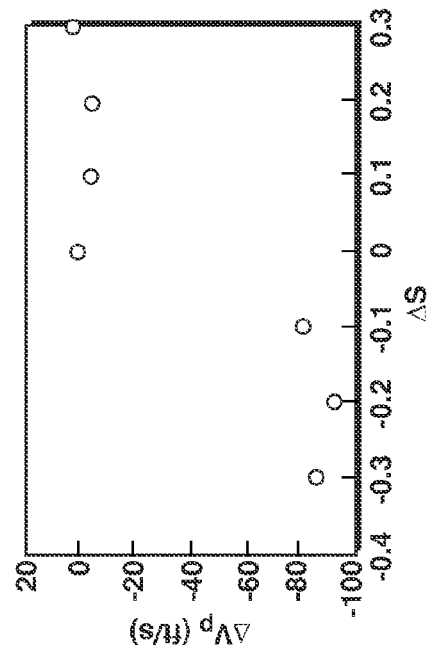
Figure 10A:
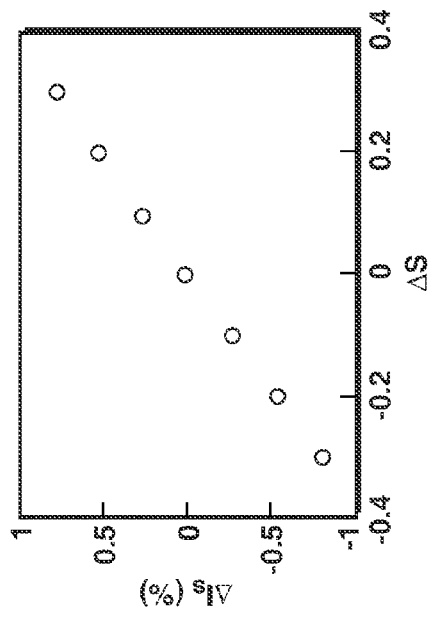
FIGS. 10A-10D are charts showing the expected effect of pore saturation change for a low permeability rock formation assuming patchy fluid saturation distribution.
Figure 10B:
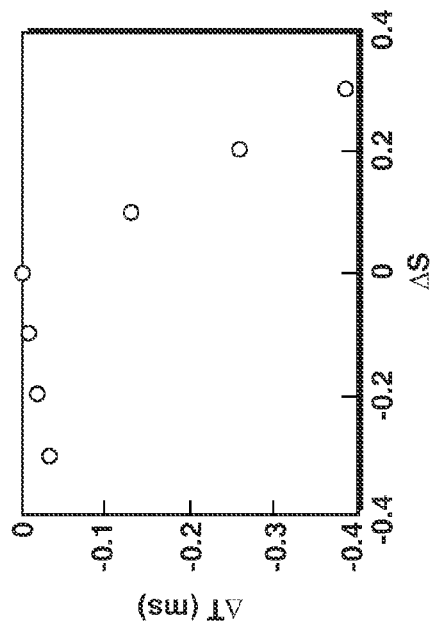
Figure 10C:
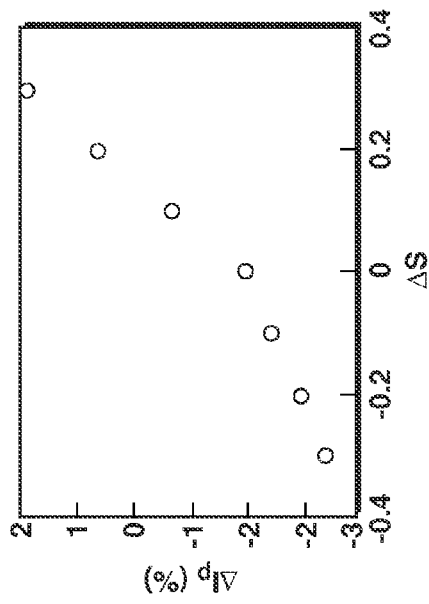
Figure 10D:
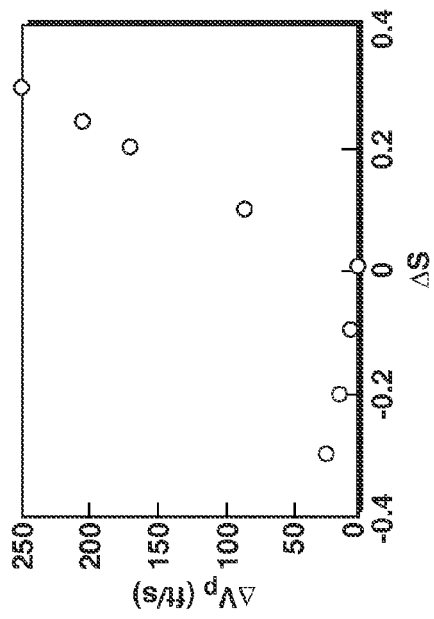

FIGS. 6A-6D, 7A-7D, 8A-8D, 9A-9D, and 10A-10D depict outputs of seismic modeling of a carbonate field having a water saturation increase in the range from 0 to 0.4 (fraction) and a pressure increase of up to 500 pounds per square inch (psi). The carbonate field has a high permeability formation or layer (represented by FIGS. 6A-6D and 7A-7D) and a low permeability formation or layer (represented by FIGS. 8A-8D, 9A-9D, and 10A-10D), similar to what is depicted in FIG. 1. Specifically, FIGS. 6A-6D show the expected effect of pressure change on P-impedance change in percentage (FIG. 6A), S-impedance change in percentage (FIG. 6B), P-velocity change (FIG. 6C), and $\Delta T$ (FIG. 6D), respectively, in the high permeability formation. FIGS. 7A-7D show the expected effect of saturation change on P-impedance change in percentage (FIG. 7A), S-impedance change in percentage (FIG. 7B), P-velocity change (FIG. 7C), and $\Delta T$ (FIG. 7D), respectively, in the high permeability formation. As explained previously, the attribute $A_{max}$ is a measure of the impedance, and therefore diff$A_{max}$ is a measure of impedance change. In the modeling, in-situ hydrocarbon is assumed to be oil, but may be other hydrocarbons. The reservoir fluids are assumed to consist of a mixture of gas and oil or water and oil. A single saturation change is defined to represent saturation changes of oil, gas and water. The sign in front of saturation change in the figures denotes whether gas-oil mixture (negative saturation change) or water-oil mixture (positive saturation change) is considered. In the course of oil production, gas saturation or water saturation increases at the expense of decreasing oil saturation. In the modeled carbonate field, there is essentially no gas in the system. FIGS. 8A-8D show the modeled effect of pressure change on P-impedance percent change (FIG. 8A), S-impedance percent change (FIG. 8B), P-velocity change (FIG. 8C), and $\Delta T$ (FIG. 8D), respectively. The effect of pressure change on the above quantities (P- and S-impedance, P-velocity, $\Delta T$) is governed by Equations 3 and 4 and is independent of permeability of the rock formation. FIGS. 9A-9D show the modeled effect of saturation change on P-impedance percent change (FIG. 9A), S-impedance percent change (FIG. 9B), P-velocity change (FIG. 9C), and $\Delta T$ (FIG. 9D) in the low permeability formation, assuming uniform fluid saturation distribution. FIGS. 10A-10D show the modeled effect of saturation change on P-impedance percent change (FIG. 10A), S-impedance percent change (FIG. 10B), P-velocity change (FIG. 10C), and $\Delta T$ (FIG. 10D) in the low permeability formation, assuming patchy or non-uniform fluid saturation distribution. In order for the observation in FIG. 2 and FIG. 3 to be consistent with the modeling results (FIGS. 6-10), fluid saturation distribution is likely to be patchy or non-uniform in the low-permeability carbonates (FIGS. 10A-10D), while in the high permeability carbonates, fluid saturation distribution is likely to be uniform (FIGS. 9A-9D). In general, the modeling results show that both modeled impedance change (and therefore seismic amplitude change diff$A_{max}$) and $\Delta T$ are relatively small (FIGS. 6A, 6B, 6D, 7A, 7B, 7D) and that effect of saturation change on impedance change is greater than the effect of pressure change. For $\Delta T$, the situation is different. Unlike acoustic impedance that consists of the composite effect of velocity and density, $\Delta T$ is directly proportional to velocity change. For a high permeability layer, the effect of pressure change dominates the variation of $\Delta T$. The expected $\Delta T$ for 500 psi pressure increase is 0.15 ms (FIG. 6D), whereas the expected $\Delta T$ for 40% water saturation increase (Sw=0.4) is only −0.02 (FIG. 7D). For a low permeability layer, the effect of pressure change on impedance change and $\Delta T$ (FIG. 8A, 8D) is essentially the same as is the case for the high permeability layer (FIGS. 6A, 6D). However, the effect of fluid saturation is different. The permeability is low enough so that the fluid mixing should be modeled with the Voigt average mixing scheme (Equation 8). The expected $\Delta T$ change due to saturation change (FIG. 10D) is about three times larger than the expected pressure effect on $\Delta T$ (FIG. 8D). The above examples and analyses demonstrate that time shifts, such as $\Delta T$, are more sensitive to pressure change in a high permeability layer or formation, and are more sensitive to saturation change in a low permeability layer or formation. These results are consistent with the conclusions depicted in FIGS. 2A-D, 3A-D and 4 herein.

The statistically meaningful correlations between 4D seismic attributes (e.g., $\Delta T$ and diff$A_{max}$) and pressure/saturation changes according to the invention indicate that the 4D seismic attributes may be used to infer pressure and/or saturation changes in a hydrocarbon reservoir. The inferred pressure and/or saturation changes may be used to verify or modify reservoir simulation models. Such verified and/or modified outputs may be advantageously used to predict changes in water/oil saturation in a rock formation. Accurate changes in saturation may then be used for various hydrocarbon extraction activities such as planning the location and timing of new wells, managing production from existing wells, predicting production lifetimes of wells or hydrocarbon reservoirs at various extraction rates, and other similar activities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional blocks not shown herein. While the figures illustrate various actions occurring serially, it is to be appreciated that various actions could occur in series, substantially in parallel, and/or at substantially different points in time.

Figure 11:
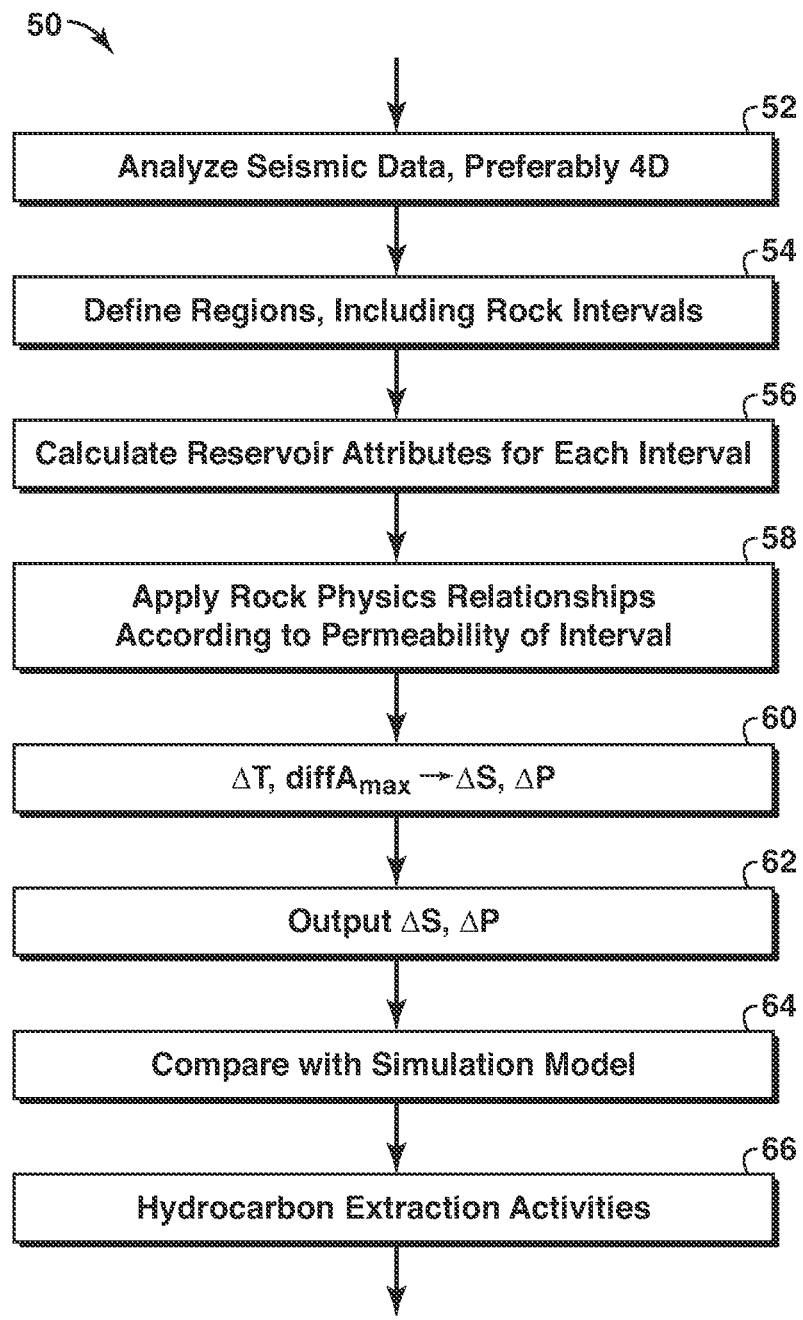
FIG. 11 is a flowchart showing a method according to the invention.

FIG. 11 is a flow diagram 50 of a method according to disclosed methodologies. At block 52 seismic data relating to a hydrocarbon reservoir is analyzed. The hydrocarbon reservoir contains substantial amounts of hard rock, such as carbonate rock, which is characterized by its relatively high stiffness when compared to porous siliciclastic rock. The seismic data preferably is 4D seismic data obtained at more than one point in time, i.e., base seismic data and monitor seismic data. To aid the analysis, the seismic data may be subjected to various processes to maximize similarities between the base and monitor seismic data and to minimize noise or other irrelevant returns. These processes may include co-processing the base and monitor seismic data to maintain maximum repeatability, and/or preserving time shifts between the base and monitor seismic data. The seismic data may be subjected to further processes such as time alignments and cross-equalization to compensate for further non-significant differences between the base seismic data and the monitor seismic data. Derivative volumes such as time shift volumes and cross correlation coefficient volumes may be retained for use in the analysis. At block 54 one or more intervals composed substantially of carbonate rock (or other hard rock) are defined. Each defined interval, which may be a rock formation or layer as depicted in FIG. 1, has a permeability level, which as explained herein may be expressed as a high permeability value or range (for example, greater than 50 millidarcies) or a low permeability value or range (for example, less than about 10 millidarcies). The defined intervals are characterized by lithology and permeability. At block 56 reservoir attributes for each of the intervals are calculated. The reservoir attributes may include static descriptors or may describe a change over time of a characteristic of the respective intervals. The reservoir attributes may include 4D seismic time shift variables such as $\Delta T$, seismic amplitude measurements such as amplitude $A_{max}$, and/or the seismic amplitude difference between the monitor and base seismic data, diffA$_{max}$. At block 58 a set of rock physics relationships are applied to the seismic data related to each interval. This is done to predict sensitivity of seismic attributes such as time shift ΔT and diffA$_{max}$ to saturation change and pressure change. At block 60, the optimal rock physics relationships may include relationships relating seismic velocity with pressure (Equations 3 and 4), the Gassmann fluid substitution equation (Equation 5), and relationships for determining bulk moduli of the rock formation (Equations 6-8) based on the bulk moduli, densities, and saturation levels of the various solid, liquid, and gaseous components of the rock formation. If the permeability level of the rock formation has been determined to be within a permeability range considered to be high, the Reuss average mixing scheme (Equation 7) is employed as part of the rock physics relationships applied at block 58. If the permeability level of the rock formation has been determined to be within a permeability range considered to be low, the Voigt average mixing scheme (Equation 8) is employed as part of the rock physics relationships applied at block 58. Applying the rock physics relationships to the seismic data associated with each interval, as performed at block 58, enables a prediction of sensitivity of 4D seismic attributes such as time shift ΔT and amplitude change diffA$_{max}$ to saturation change and pressure change. At block 60 the 4D seismic attributes such as ΔT and diffA$_{max}$ are used to infer changes in pressure and/or saturation. Specifically, in the example discussed herein, for a high permeability formation the 4D seismic attributes may be used to infer changes in pressure, and for a low permeability formation the 4D seismic attributes may be used to infer changes in saturation. At block 62 the changes in pressure and/or saturation inferred by the method may be output to a printer, stored in a computer-readable storage medium, or other output means. Outputting the changes in pressure and/or saturation may include displaying said changes. At block 64 the changes in pressure and/or saturation inferred by the method may be compared to outputs from a reservoir simulation model, such as pressure change and water saturation change, to verify the accuracy thereof and/or modify the simulation model. At block 66 various hydrocarbon extraction activities may be conducted, implemented, or planned based on the outputs of block 60 (i.e., pressure/saturation changes inferred from 4D seismic data) and/or the outputs of blocks 62 and 64 (verified and/or corrected outputs of a reservoir simulation model). The hydrocarbon extraction activities may include those previously discussed herein, or may include other known activities central or peripheral to extracting hydrocarbons from a hydrocarbon reservoir.

Figure 12:
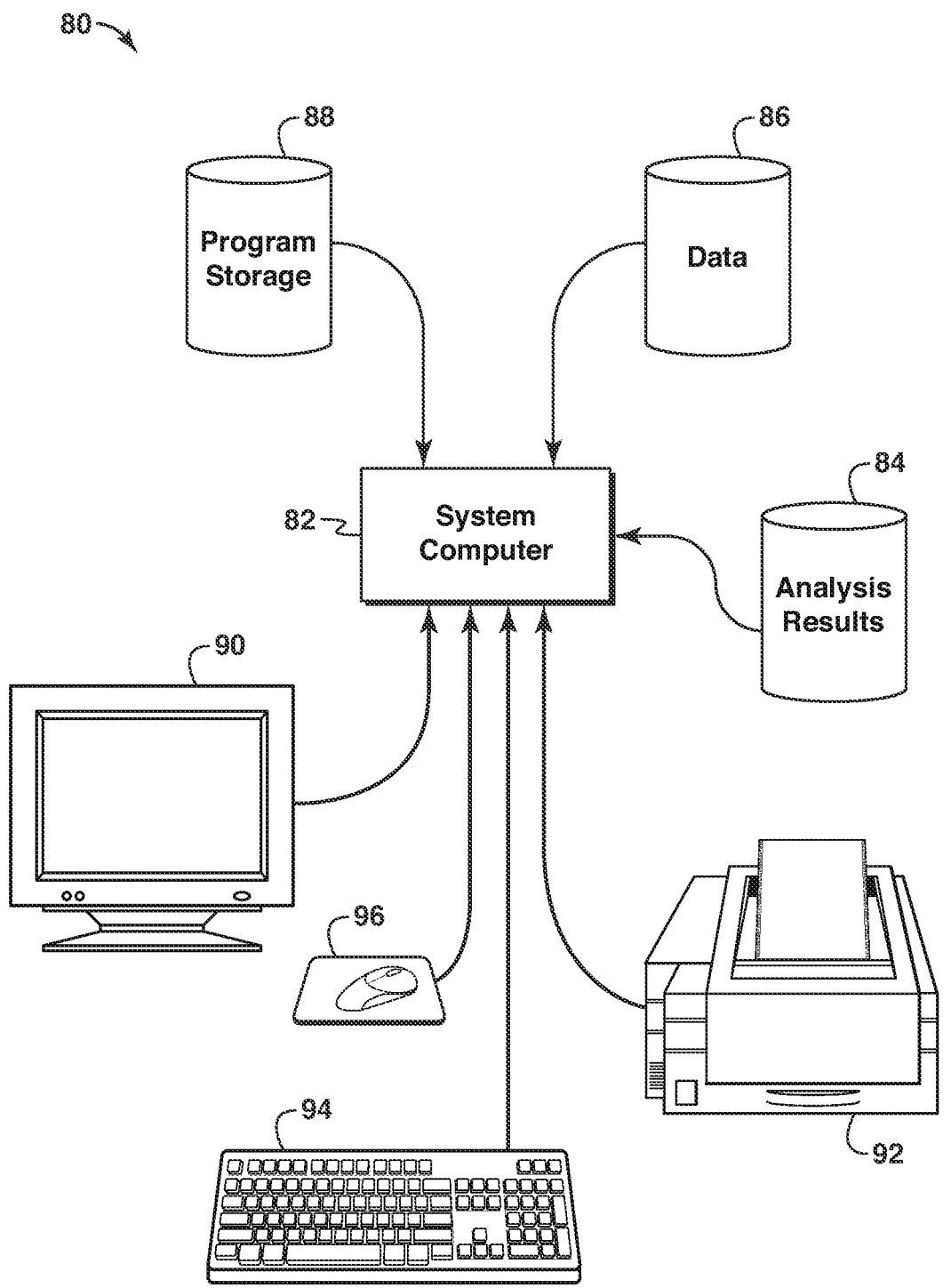
FIG. 12 is a simplified block diagram of a computer environment according to the invention.

FIG. 12 depicts a block diagram of a computing environment 80 that may implement one or more of the disclosed methods according to the invention. Computing environment 80 includes a system computer 82, which may be implemented as any conventional personal computer or workstation, such as a UNIX-based workstation. The system computer 82 is in communication with disk storage devices 84, 86, and 88, each of which may be any known type of computer-readable storage media such as external hard disk storage devices that are either directly connected to the system computer or accessed using a local area network or by remote access. Although disk storage devices 84, 86, and 88 are illustrated as separate devices, a single disk storage device may be used to store any and all of the program instructions, measurement data, and results as desired.

In one embodiment, the input data are stored in disk storage device 86. The system computer 82 may retrieve the appropriate data from the disk storage device 86 to perform the model development and reservoir performance prediction according to program instructions that correspond to the methods described herein. The program instructions may be written in a computer programming language, such as C++, Java and the like. The program instructions may be stored in a computer-readable memory, such as program disk storage device 88. System computer 82 presents output primarily onto a text/graphics display 90, or alternatively to a printer 92. The system computer 82 may store the results of the methods described above on disk storage 84, for later use and further analysis. A keyboard 94 and a pointing device (e.g., a mouse, trackball, or the like) 96 may be provided with the system computer 82 to enable interactive operation. The system computer 82 may be located at a data center remote from the reservoir. Additionally, while the description above is in the context of computer-executable instructions that may run on one or more computers, those skilled in the art will recognize that the subject matter as claimed also can be implemented in combination with other program modules and/or as a combination of hardware and software.

The disclosed embodiments and methodologies may be susceptible to various modifications and alternative forms and have been shown only by way of example. The disclosed embodiments and methodologies are not intended to be limited to the particular embodiments disclosed herein, but includes all alternatives, modifications, and equivalents falling within the spirit and scope of the appended claims.

The invention claimed is:

1. A method comprising:
    (a) analyzing seismic data related to a hydrocarbon reservoir containing rock, wherein the seismic data includes a first set of seismic data obtained at a first time and a second set of seismic data obtained at a second, subsequent time;
    (b) identifying an interval substantially comprising rock in the hydrocarbon reservoir, wherein the interval has a permeability level associated therewith;
    (c) calculating 4D seismic attributes for the interval;
    (d) applying a first set of rock physics relationships to seismic data related to the interval when the permeability level associated therewith is in a first permeability range;
    (e) applying a second set of rock physics relationships to seismic data related to the interval when the permeability level associated therewith is in a second permeability range, the first and second permeability ranges being non-overlapping;
    (f) inferring one of a fluid saturation change and a pressure change of the interval based on outputs of one of the first and second sets of rock physics relationships and the calculated 4D seismic attributes for the interval; and
    (g) outputting to a non-transient medium the inferred one of the fluid saturation change and the pressure change of the interval;
    wherein the first set of rock physics relationships includes an equation to determine a bulk modulus of fluid in the interval using a harmonic average of bulk moduli of components of the fluid, and the second set of rock physics relationships includes an equation to determine a bulk modulus of fluid in the interval using an arithmetic average of bulk moduli of components of the fluid.

2. The method of claim 1, wherein the interval is a first interval, and further comprising:
    defining an additional interval substantially comprising rock in the hydrocarbon reservoir, wherein the additional interval has a permeability level associated therewith; and completing steps (c), (d), (e), (f), and (g) for the additional interval.

3. The method of claim 1, wherein the interval is a first interval, and further comprising:
defining additional intervals substantially comprising rock in the hydrocarbon reservoir, wherein each of the additional intervals has a permeability level associated therewith; and
completing steps (c), (d), (e), (f), and (g) for each of the additional intervals.

4. The method of claim 1, further comprising:
verifying an output of a reservoir simulation model using the one of the fluid saturation change and the pressure change of the interval;
revising the reservoir simulation model so that prediction from the simulation model is consistent with the fluid saturation change and the pressure change calculated from 4D seismic and selected rock physical relationships; and
outputting one of the corrected output of the reservoir simulation model and the verified output of the reservoir simulation model.

5. The method of claim 1, further comprising:
conducting hydrocarbon extraction activity based on the output of at least one of the fluid saturation change and the pressure change of the interval that are computed from the outputs of one of the rock physics relationships and the 4D seismic attributes for the interval.

6. The method of claim 1, wherein the harmonic average comprises a Voigt average.

7. The method of claim 1, wherein the components of the fluid include at least two of gas, oil, and water.

8. The method of claim 1, wherein the arithmetic average comprises a Reuss average.

9. The method of claim 1, wherein analyzing the seismic data includes at least one of
co-processing the seismic data to maintain maximum repeatability;
preserving time shifts between the second set of seismic data and the first set of seismic data;
making time alignments to the seismic data;
cross-equalizing the seismic data; and
retaining derivative volumes.

10. The method of claim 1, wherein at least one of the 4D seismic attributes describe a change over time of a characteristic of the interval.

11. The method of claim 1, wherein one of the 4D seismic attributes is an amplitude of a returning seismic signal.

12. The method of claim 1, wherein one of the 4D seismic attributes is a change over time of an amplitude of a returning seismic signal.

13. The method of claim 1, wherein one of the 4D seismic attributes is a time shift.

14. The method of claim 1, wherein the second set of seismic data further relates to the hydrocarbon reservoir at at least one additional time.

15. A method comprising:
defining a plurality of non-overlapping subsurface intervals in a hydrocarbon reservoir, each subsurface interval primarily comprising rock;
separately analyzing 4D seismic data related to each of the subsurface intervals, the 4D seismic data including base seismic data and monitor seismic data;
calculating seismic attributes for each of the subsurface intervals;
applying rock physics relationships to the 4D seismic data related to each of the subsurface intervals based upon a permeability level of the respective subsurface interval;
inferring a fluid saturation change of each of the subsurface intervals based on at least one of the rock physics relationships and the seismic attributes of said each of the subsurface intervals;
verifying outputs of the hydrocarbon reservoir simulation model using the inferred fluid saturation change of each of the subsurface intervals;
modifying the hydrocarbon reservoir simulation model according to the inferred fluid saturation change of each of the subsurface intervals; and
outputting to a non-transient medium the verified hydrocarbon reservoir simulation model or the modified hydrocarbon reservoir simulation model;
wherein the rock physics relationships include an equation to determine a bulk modulus of fluid in the interval using
a harmonic average of bulk moduli of components in the fluid when the permeability level in said each of the subsurface intervals is less than a first predetermined amount, and
an arithmetic average of bulk moduli of components of the fluid when the permeability level in said each of the subsurface intervals is greater than a second predetermined amount.

16. The method of claim 15, further comprising conducting hydrocarbon extraction activity based on the output from the modified reservoir simulation model.

17. The method of claim 15, wherein the seismic attributes include at least one of an amplitude of a returning seismic signal, a change over time of an amplitude of a returning seismic signal, and a time shift.

18. A method of extracting hydrocarbons from a subsurface reservoir, comprising:
analyzing seismic data relating to a hydrocarbon reservoir comprising rock, wherein the seismic data includes a first set of seismic data relating to the hydrocarbon reservoir at a first time and a second set of seismic data relating to the hydrocarbon reservoir at a second time;
defining an interval substantially comprising rock in the hydrocarbon reservoir, wherein the interval has a permeability level associated therewith;
calculating 4D seismic attributes for the interval;
applying a first set of rock physics relationships to seismic data related to the interval when the permeability associated therewith is in a first range;
applying a second set of rock physics relationships to seismic data related to the interval when the permeability associated therewith is in a second range, the first and second ranges being non-overlapping;
inferring one of a fluid saturation change and a pressure change of the interval based on outputs of one of the first and second sets of rock physics relationships and the calculated 4D seismic attributes for the interval;
verifying an output of a reservoir simulation model using the one of the fluid saturation change and the pressure change of the interval;
revising the reservoir simulation model so that a prediction from the simulation model is consistent with the fluid saturation change and the pressure change calculated from 4D seismic and selected rock physical relationships;
outputting one of the corrected output of the reservoir simulation model and the verified output of the reservoir simulation model; and extracting hydrocarbons from the subsurface reservoir based on the outputted one of the corrected output of the reservoir simulation model and the verified output of the reservoir simulation model;

wherein the first set of rock physics relationships includes an equation to determine a bulk modulus of fluid in the interval using a harmonic average of bulk moduli of components of the fluid, and the second set of rock physics relationships includes an equation to determine a bulk modulus of fluid in the interval using an arithmetic average of bulk moduli of components of the fluid.

19. A tangible computer readable medium having computer executable logic recorded thereon, comprising:

code for defining a subsurface interval as primarily comprising rock;

code for analyzing 4D seismic data related to the subsurface interval, the 4D seismic data including base seismic data and monitor seismic data;

code for calculating seismic attributes for the subsurface interval;

code for applying rock physics relationships to the 4D seismic data related to the subsurface interval based upon a permeability level of the subsurface interval;

code for inferring a fluid saturation change of the subsurface interval based on at least one of the rock physics relationships and the seismic attributes of the subsurface interval;

code for verifying an output of a hydrocarbon reservoir simulation model using the inferred fluid saturation change;

code for correcting the hydrocarbon reservoir simulation model when the output is inconsistent with the inferred fluid saturation change; and code for outputting one of the verified output and the corrected output;

wherein the rock physics relationships include an equation to determine a bulk modulus of fluid in the interval using a harmonic average of bulk moduli of components in the fluid when the permeability level in said each of the subsurface intervals is less than a first predetermined amount, and an arithmetic average of bulk moduli of components of the fluid when the permeability level in said each of the subsurface intervals is greater than a second predetermined amount.

* * * * *